United States Patent [19]

Tomlinson

[11] 4,275,625
[45] Jun. 30, 1981

[54] MULTI-SPINDLE LATHES

[75] Inventor: Geoffrey E. S. Tomlinson, Solihull, England

[73] Assignee: White-BSA Tools Ltd., Birmingham, England

[21] Appl. No.: 41,482

[22] Filed: May 22, 1979

[30] Foreign Application Priority Data

May 24, 1978 [GB] United Kingdom ............... 22138/78

[51] Int. Cl.³ .................. B23B 21/00; B23B 3/34; B23B 29/00
[52] U.S. Cl. ............................................. 82/25; 82/3; 82/36 R
[58] Field of Search .................... 82/25, 3, 36 R, 36 A

[56] References Cited

U.S. PATENT DOCUMENTS

| 3,181,400 | 5/1965 | Kohring | 82/25 |
| 3,648,551 | 3/1972 | Dahl | 82/36 R |
| 3,798,720 | 3/1974 | Ledergerber et al. | 82/3 |

FOREIGN PATENT DOCUMENTS 640278  5/1962  Italy .............................. 82/3

Primary Examiner—Harrison L. Hinson

[57] ABSTRACT

The invention provides a tool slide having a body with a generally cylindrical external surface and a plurality of external grooves therein. Each adjacent pair of grooves defines therebetween a respective dovetail-section rail on which a tool holder can be mounted in use. In practice, the tool slide may be combined with at least one tool holder mounted on one of the rails and having a part-cylindrical locating surface which is complementary to the external surface of the tool slide.

11 Claims, 4 Drawing Figures

MULTI-SPINDLE LATHES

This invention relates to a tool slide which is particularly, but not exclusively, for use in a multi-spindle machine tool.

Multi-spindle machine tools generally comprise a spindle carrier indexably mounted on a frame, and a plurality of work spindles rotatably mounted on the carrier. A tool slide is displaceable axially of the carrier, and is conventionally of polygonal cross-section having planar tool holder-locating faces formed with T-section slots for the securement of tool holders thereto. Polygonal tool sides of this kind are, however, expensive to manufacture. Moreover, if it is desired to use tool holders which are independently movable, it is necessary to provide a separate tool slide for each tool holder.

It is an object of the present invention to obviate or mitigate the above-mentioned disadvantages.

According to the present invention, there is provided a tool slide comprising a body having a generally cylindrical external surface and a plurality of external grooves therein, each adjacent pair of grooves defining therebetween a respective dovetail-section rail on which a tool holder can be mounted in use.

Also according to the present invention, there is provided in combination a tool slide as defined in the last preceding paragraph and at least one tool holder for mounting on a respective one of the dove-tail section rails and having a part-cylindrical locating surface which is complementary to the external surface of the tool slide.

In this way, not only can the tool slide and the individual tool holders be machined to the necessary high level of accuracy less expensively than has been possible in the above-described conventional construction, but also the dovetail-section rails can be used for either fixed or independently displaceable tool holders.

Further according to the present invention, there is provided a multi-spindle machine tool comprising a frame, a spindle carrier indexably mounted on the frame, a plurality of work spindles rotatably mounted on the spindle carrier, and a tool slide as defined in the third preceding paragraph movable towards and away from the spindle carrier.

An example of the present invention will now be described, by way of example, with reference to the accompanying drawings, in which.

Figure 1:
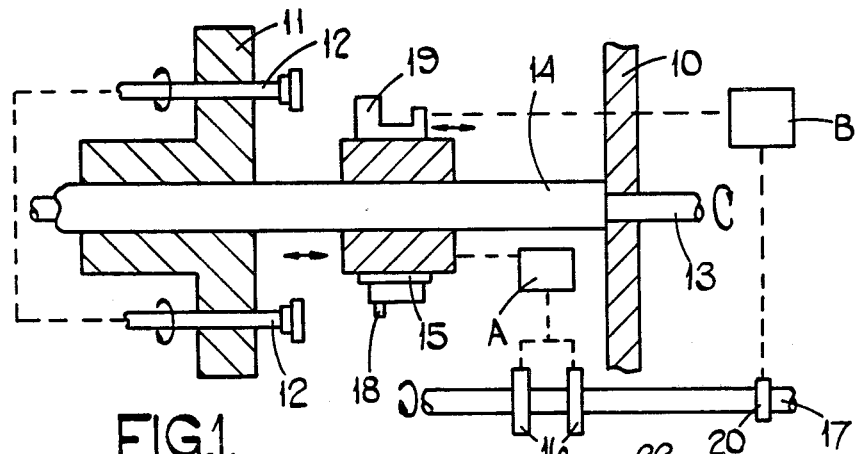
FIG. 1 is a schematic sectional side view of a mult-spindle lathe.

Referring first to FIG. 1, the multi-spindle lathe illustrated therein comprises a frame 10 having a spindle carrier 11 thereon, the carrier 11 being indexable relative to the frame 10. A plurality of parallel, equi-angularly spaced work spindles 12 are rotatably mounted on the carrier 11, and are driven in use by a main drive shaft 13 which extends co-axially of the carrier. A guide tube 14 surrounds the shaft 13 and has a tool slide 15 mounted thereon for movement towards and away from the carrier 11 in the axial direction. The tool slide 15 is preferably mounted on the guide tube 14 by way of hydrostatic bearings for ease of movement.

Movement of the tool slide 15 towards and away from the carrier 11 is performed by a mechanism A operated by a pair of cams 16 on a rotatable cam shaft 17. The tool slide 15 is arranged to mount tool holders thereon, which can either be fixed, as indicated at 18, or movable towards and away from the carrier 11 independently of the tool slide 15, as indicated at 19. Such movement of the tool holder 19 is performed by a mechanism B operated by a pair of cams 20 (only one shown) on the cam shaft 17. The tool holders can receive fixed or rotatable tools.

Figure 2:
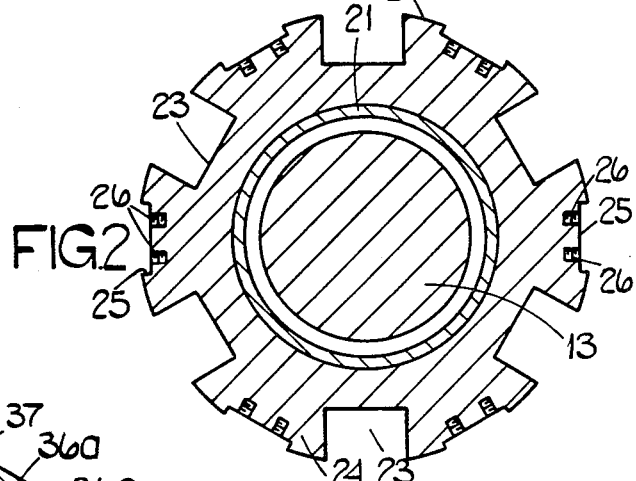
FIG. 2 is a section through a tool slide according to the present invention, which forms part of the multi-spindle lathe shown in FIG. 1.

FIG. 2 shows the tool slide 15 in greater detail. The tool slide 15 has a cylindrical internal surface 21 which is a sliding fit on the guide tube 14, and a cylindrical external surface 22 which is machined so as to be accurately co-axial with the internal surface 21. A plurality of parallel rectangular section grooves 23 are formed in the cylindrical external surface 22, each pair of adjacent grooves 23 defining therebetween a respective dovetail-section rail 24 extending axially of the tool slide 15. Portions of the cylindrical external surface 22 between the grooves 23 are provided with shallow rectangular section recesses 25 therein having two rows of bolt holes 26 therein.

Figure 3:
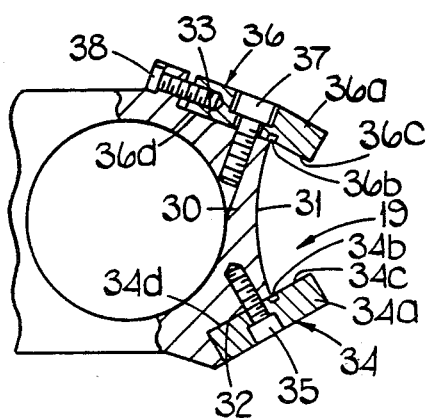
FIGS. 3 and 4 are, respectively, sectional view of parts of two types of tool holder which can be used with the tool slide shown in FIG. 2.

An example of the movable tool holder 19 is shown in detail in FIG. 3, and comprises a body 30 having a concave cylindrical locating surface 31 which is complementary to the external surface 22 of the tool slide 15, and bearing surfaces 32 and 33 at either side of the locating surface 31. A fixed side member 34 is secured to one side of the body 30 by means of bolts 35 (only one shown) so as to bear against the bearing surface 32. The member 34 has a portion 34a which extends beyond the locating surface 31, a groove 34b being formed in the member 34 where it adjoins this surface. An adjustable side member 36 is secured to the other side of the body 30 by means of bolts 37 (only one shown) so as to bear against the bearing surface 33. A portion 36a of the member 36 extends beyond the locating surface 31, a groove 36b being formed in the member 36 where it adjoins this surface.

The side members 34 and 36 present respective faces 34c and 36c to each other which are mutually inclined at the same angle as opposite faces of each dovetail-section rail 24 of the tool slide 15, the angle being 60° in this case. The bearing surface 33 is inclined at a small angle to the face 36c, however, and the adjustable side member 36 is correspondingly cranked. Adjusting screws 38 (only one shown) are provided for adjusting the position of the side member 36 relative to the body 30 in the direction of extent of the bearing surfaces 33, such adjustment effectively varying the spacing between the face 36c and the face 34c. To accommodate for this adjustment, the bolts 37 pass with clearance through holes in the side member 36.

Fine angular adjustment of the tool holder 19 on the slide 15 in one direction or the other can be achieved by machining, as by grinding, the face 34c of the side member 34 or a face 34d thereof which engages the bearing surface 32. The groove 34b separates the surfaces 34c and 34d and facilitates their separate machining.

Accurate angular adjustment of the face 36c of the side member 36 to the bearing surface 33 is achieved by similarly machining the face 36c or a face 36d of the member 36 which engages the bearing surfaces 33. The groove 36b separates the faces 36c and 36d so that the separate machining of these faces is facilitated.

The tool holder 19 can be mounted on any of the dove-tail section rails 24 for sliding movement along the tool slide 15, and any slackness of the tool holder on the rail can be eliminated by appropriate adjustment of the screws 38.

Figure 4:
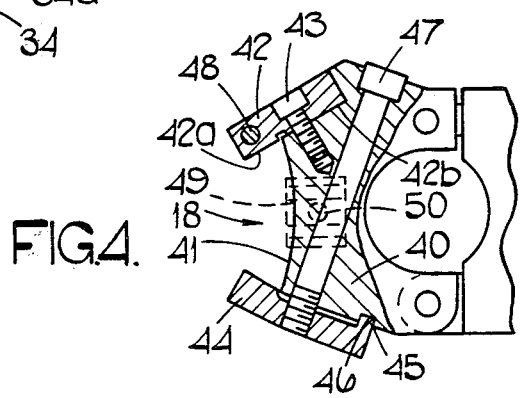

An example of the fixed tool holder 18 is shown in FIG. 4, and comprises a body 40 having a concave cylindrical locating surface 41 which is complementary to the external surface 22 of the tool slide 15. A fixed side member 42 is secured by bolts 43 to one side of the body in a similar manner to the side member 34 of the movable tool holder. An adjustable side member 44 is swingable about a rib 45 which is received in a groove 46 in the body 40 and which extends parallel to the end of the locating surface 41, the angular position of the member 44 relative to the body being adjustable by means of a bolt 47. Such adjustment is used to clamp the tool holder 18 onto one of the dovetail-section rails 25 of the tool slide 15. Faces 42a and 42b of the fixed side member 42, corresponding to the faces 34c and 34d of the member 34 in FIG. 3, can be machined for fine angular adjustment of the tool holder on the slide 15.

In order to ensure accuracy in the axial positioning of the tool holder 18 on the slide 15, an adjustable end stop 48 is fitted in a bore in the fixed side member 42, and is engageable with a fixed stop on the tool slide 15. In an alternative arrangement, a block 49 (indicated in broken line) is secured in the appropriate shallow recess 25 of the tool slide 15 by means of bolts (not shown) which engage the bolt holes 26, and an adjustment screw 50 thereon bears against the end of the tool holder 18.

In each of the constructions described above, the position of the tool holder on the slide is accurately determined by the fixed side member 34 or 42 and by the concave locating surface 31 or 41. These can therefore be used to provide datum faces from which a tool in the tool holder can be pre-set off the lathe, if required. In the case of the tool holder 18 shown in FIG. 4, the stop 48 can be pre-adjusted during manufacture of the tool holder to provide a third datum. Alternatively, the stop 48 or the screw 50 can be adjusted during setting of the tool holder.

I claim:

1. A tool slide comprising a body having a circular cylindrical external surface divided into a plurality of convex part-circular cylindrical portions by grooves of substantially rectangular cross-section which open onto said external surface at spaced intervals therearound, adjacent side walls of each pair of adjacent grooves being mutually inclined, and a plurality of dovetail-section rails provided on said body for receiving at least one tool holder thereon, each said rail being formed by a respective one of said part-circular cylindrical portions and said mutually inclined adjacent side walls of the respective pair of adjacent grooves.

2. The tool slide according to claim 1, wherein said part-circular cylindrical portion of each said rail is provided with mounting means to which a block can be secured for positioning of a tool holder on said rail.

3. A tool slide assembly comprising:
   (a) a body having a circular cylindrical external surface divided into a plurality of convex part-circular cylindrical portions by grooves of substantially rectangular cross-section which open onto said external surface at spaced intervals therearound, adjacent side walls of each pair of adjacent grooves being mutually inclined;
   (b) a plurality of dovetail-section rails provided on said body, each said rail being formed by a respective one of said convex part-circular cylindrical portions and said mutually inclined adjacent side walls of the respective pair of adjacent grooves; and
   (c) at least one tool holder for mounting on a respective rail, said at least one tool holder including a concave part-circular cylindrical locating surface for engagement with said convex part-circular cylindrical portion of said respective rail.

4. The tool slide assembly according to claim 3, further comprising adjustable stop means between said body and said at least one tool holder, said adjustable stop means permitting the position of said at least one tool holder to be set on said respective rail.

5. The tool slide assembly according to claim 4, wherein said adjustable stop means comprises an adjustable stop on said at least one tool holder and a fixed stop on said respective rail.

6. The tool slide assembly according to claim 4, wherein said adjustable stop means comprises a block secured to said respective rail and an adjustable stop on said block for engagement with said at least one tool holder.

7. A tool slide assembly comprising:
   (a) a body having a circular cylindrical external surface divided into a plurality of convex part-circular cylindrical portions by grooves of substantially rectangular cross-section which open onto said external surface at spaced intervals therearound, adjacent side walls of each pair of adjacent grooves being mutually inclined;
   (b) a plurality of dovetail-section rails provided on said body, each said rail being formed by a respective one of said convex part-circular cylindrical portions and said mutually inclined adjacent side walls of the respective pair of adjacent grooves; and
   (c) at least one tool holder for mounting on a respective rail, said at least one tool holder including a body, a concave part-circular cylindrical locating surface on said body for engagement with said convex part-circular cylindrical portion of said respective rail, a first side member fixed to said body and extending beyond said locating surface at one end thereof, and a second side member adjustably mounted on said body and extending beyond an opposite end of said locating surface, said first and second side members being engageable respectively with said adjacent side walls of said respective rail, adjustment of said second side member relative to said body serving to clamp said at least one tool holder to said respective rail.

8. The tool slide assembly according to claim 7, wherein said second side member is swingable relative to said body of said at least one tool holder about an axis parallel to said locating surface.

9. The tool slide assembly according to claim 8, wherein said second side member has a rib which locates in a groove in said body of said at least one tool holder, and said second side member is swingable about said rib.

10. The tool slide assembly according to claim 7, wherein said first and second side members have respective engagement faces which are engageable with said side walls of said respective rail and which are mutually inclined at the same angle as said side walls, and said second side member engages said body of said at least one tool holder over a bearing surface which is inclined to said engagement surface of said second side member, said second side member being adjustable relative to said body along said bearing surface.

11. The tool slide assembly according to claim 10, wherein said engagement surface and said bearing surface of said second side member are separated by a groove so as to facilitate their separate machining.

* * * * *